(12) United States Patent
Pizzoni et al.

(10) Patent No.: US 9,371,895 B2
(45) Date of Patent: Jun. 21, 2016

(54) LINEAR ELECTRO-MECHANICAL ACTUATOR WITH BUILT-IN ANTI-ROTATION

(71) Applicant: UMBRA CUSCINETTI S.P.A., Foligno (PG) (IT)

(72) Inventors: Luciano Pizzoni, Foligno (IT); Romano Beffa, Perugia (IT); Riccardo MacCaglia, Montecastrilli (IT); Massimiliano Bosi, Foligno (IT); Marcello Piermarini, Foligno (IT)

(73) Assignee: UMBRA CUSCINETTI S.P.A., Foligno (PG) (IT)

( * ) Notice: Subject to any disclaimer, the term of this patent is extended or adjusted under 35 U.S.C. 154(b) by 0 days.

(21) Appl. No.: 14/439,327

(22) PCT Filed: Sep. 19, 2013

(86) PCT No.: PCT/IT2013/000255
§ 371 (c)(1),
(2) Date: Apr. 29, 2015

(87) PCT Pub. No.: WO2014/080433
PCT Pub. Date: May 30, 2014

(65) Prior Publication Data
US 2015/0285349 A1 Oct. 8, 2015

(30) Foreign Application Priority Data

Nov. 22, 2012 (IT) .............................. RM2012A0587

(51) Int. Cl.
*F16H 3/06* (2006.01)
*F16H 25/24* (2006.01)
(Continued)

(52) U.S. Cl.
CPC ............ *F16H 25/24* (2013.01); *F16H 25/2214* (2013.01); *F16H 2025/204* (2013.01); *F16H 2025/2078* (2013.01); *Y10T 74/18576* (2015.01)

(58) Field of Classification Search
CPC ................ F16H 25/24; F16H 25/2214; F16H 2025/204; F16H 2025/2078
USPC .................................. 74/89.23, 89.37, 89.31
See application file for complete search history.

(56) References Cited

U.S. PATENT DOCUMENTS 2,568,404 A * 9/1951 Nardone ................. F02N 13/00
74/89.23
3,046,808 A * 7/1962 De Mart .............. F16H 25/2204
254/103

(Continued)

FOREIGN PATENT DOCUMENTS

DE 202008001576 U1 4/2008
EP 1548327 A1 6/2005

OTHER PUBLICATIONS

International Search Report, dated Feb. 2, 2014, from corresponding PCT application.

*Primary Examiner* — William Kelleher
*Assistant Examiner* — Zakaria Elahmadi
(74) *Attorney, Agent, or Firm* — Young & Thompson

(57) ABSTRACT

A linear electro-mechanical actuator, includes a containment structure (2), one or two pushers facing each other (7), a nut (5) rotatable about an axis (X) driven by a driving force, a screw shaft (6) inserted in the nut (5), connected to the pushers and interconnected with the nut (5) via a helical recirculating ball coupling (5a, 6a), and an anti-rotation mechanism (8) acting on the screw shaft (6) to prevent the screw shaft (6) from rotating about the axis (X). The anti-rotation mechanism (8) includes a pair of fixed guide bars (9), coupled in a sliding fashion with the screw shaft (6) and extending along a direction parallel to the axis (X) and spaced from the axis (X).

20 Claims, 3 Drawing Sheets

(51) Int. Cl.
*F16H 25/22* (2006.01)
*F16H 25/20* (2006.01)

(56) References Cited

U.S. PATENT DOCUMENTS

| | | | | |
|---|---|---|---|---|
| 3,404,580 A * | 10/1968 | Valenti | ................ | F16H 25/2056 74/89.35 |
| 5,094,118 A * | 3/1992 | Morita | ................ | B25J 9/102 74/424.9 |
| 7,249,918 B1 * | 7/2007 | Bowman | ................ | B23C 1/20 166/55.2 |
| 7,870,803 B2 * | 1/2011 | Schroeppel | ......... | F16H 25/2056 74/89.34 |
| 7,891,265 B2 * | 2/2011 | Erikson | ................ | F16H 25/2006 310/75 D |
| 7,980,972 B1 * | 7/2011 | Starkey | ................ | F16H 63/062 474/39 |
| 7,980,973 B1 * | 7/2011 | Starkey | ................ | F16H 63/062 474/18 |
| 8,015,889 B2 * | 9/2011 | Wingett | ................ | F16H 25/20 384/507 |
| 2011/0234021 A1 * | 9/2011 | Eckstein | ................ | F16H 25/20 310/12.31 |
| 2012/0024093 A1 * | 2/2012 | Yamakura | ........... | F16H 25/2223 74/89.23 |
| 2012/0137802 A1 * | 6/2012 | Balducci | ................ | B64C 25/24 74/89.23 |
| 2013/0000430 A1 * | 1/2013 | Zychowski | ............. | B25B 27/30 74/89.23 |
| 2013/0019420 A1 * | 1/2013 | Gronli | ................ | F16C 29/0685 15/104.04 |
| 2015/0059503 A1 * | 3/2015 | Baric | ................ | F16H 25/20 74/89.32 |

* cited by examiner

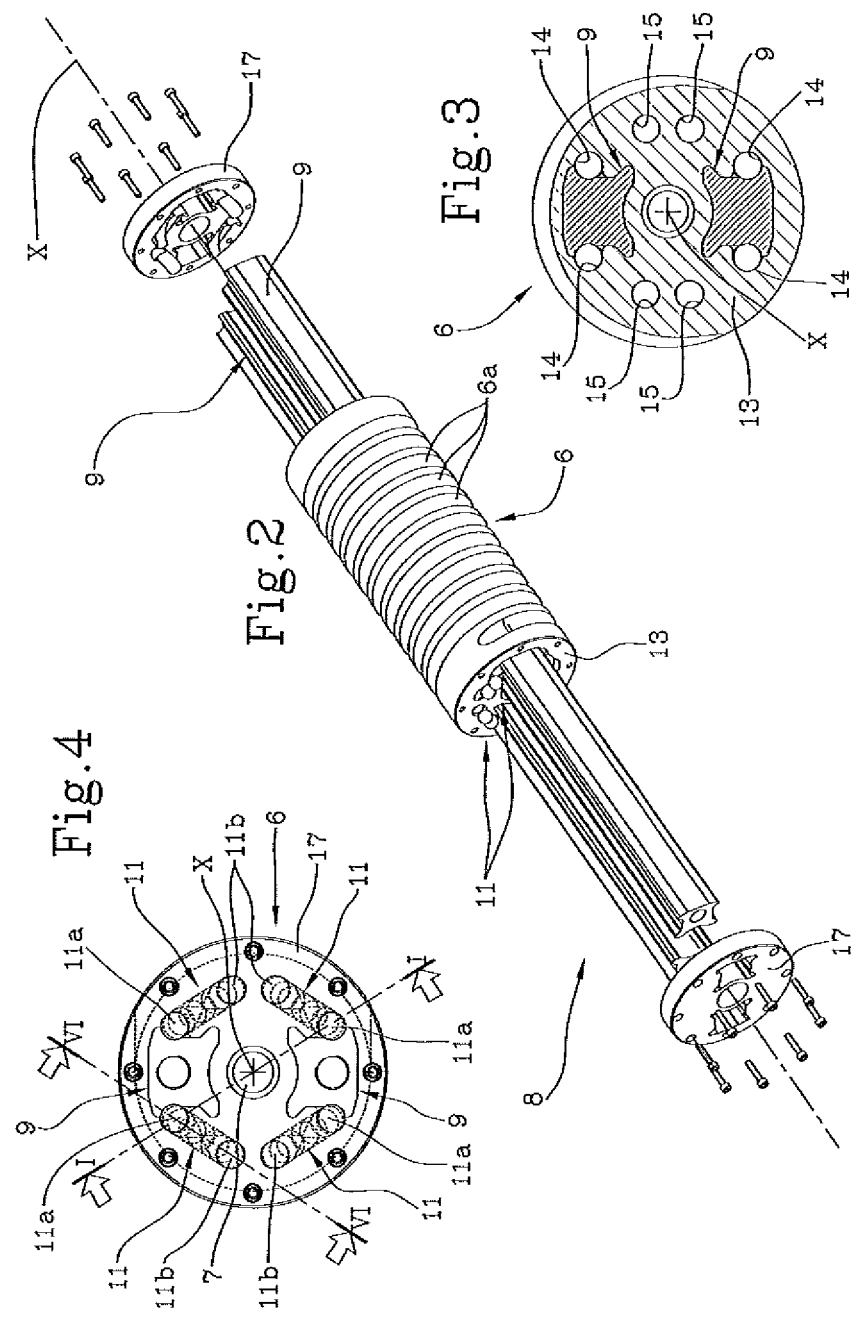

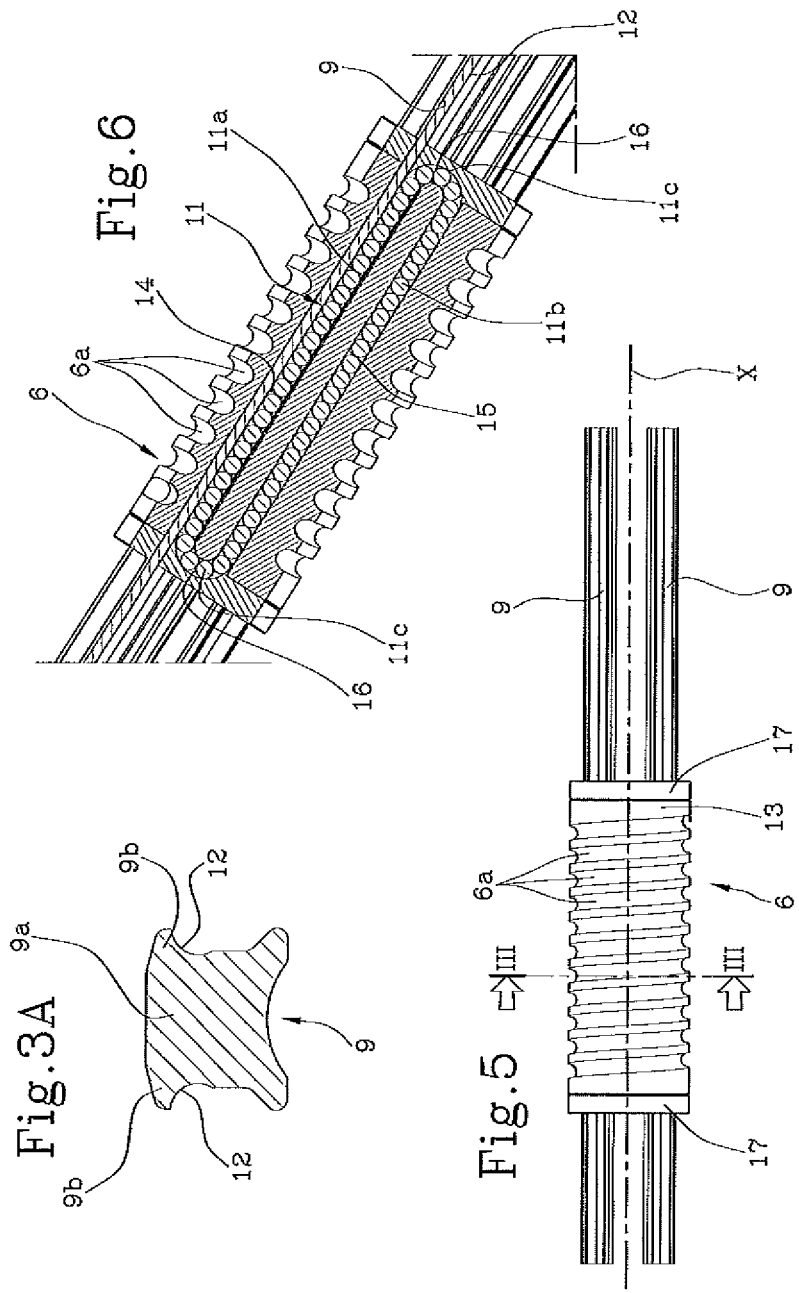

LINEAR ELECTRO-MECHANICAL ACTUATOR WITH BUILT-IN ANTI-ROTATION

TECHNICAL FIELD

This invention relates to a linear electro-mechanical actuator with built-in anti-rotation, in particular of the recirculating ball screw type.

The linear electro-mechanical actuators generally have an electric motor the stator of which is connected to a screw device (for example of the recirculating ball screw type) designed to transform the rotary movement of the rotor into a linear forward movement of one or more pushers forming part of the screw device.

So that the above-mentioned pushers (translatory elements of the screw device) can be provided with only linear translating motion, the linear electro-mechanical actuator must be equipped with an anti-rotation system which, for the equilibrium of the forces, balances the torque generated by the electric motor.

BACKGROUND ART

Prior art anti-rotation systems are described, for example, in the patent publications JP2002-54708 and JP59-19762 and use anti-rotation structures forming part of the actuator or rigidly connected to it.

The traditional anti-rotation systems have the following limitations:

- they are highly susceptible to misalignment between the actuator and the structure where the anti-rotation is performed; in particular, in all those applications with high operational loads and continuous operating conditions, the misalignments between actuator and anti-rotation structure generate transversal loads on the actuator which can lead to a malfunction of the device, a rapid deterioration of its performance and, therefore, a low reliability of the system;
- all those applications with high operational loads and continuous operating conditions require large spaces for containing an anti-rotation structure which is sufficiently robust to satisfy the load capacity and duration requirements needed by the application;
- they lead to an increase in the translatory masses of the actuator and, therefore, to a reduction in the dynamic performance of the system;
- the anti-rotation systems of the sliding type are traditionally used where the pressures between the contact elements and the duration requirements are substantially reduced; in applications with high operational loads and continuous operating conditions, the sliding type anti-rotations systems can lead to a rapid deterioration of the performance and, therefore, to a low reliability of the system;
- the anti-rotations systems are normally positioned in series relative to the recirculating ball screw element leading to a large axial dimension and, in any case, to the sum in series of the stroke of the screw with the stroke of the anti-rotation.

DISCLOSURE OF THE INVENTION

The aim of this invention is therefore to provide a linear electro-mechanical actuator that overcomes the above-mentioned drawbacks of the prior art.

More specifically, the aim of this invention is to provide a linear electro-mechanical actuator with built-in anti-rotation which has high robustness and, at the same time, compact dimensions.

This aim is fully achieved by the single-acting electro-mechanical actuator according to this invention as characterised in the appended claims.

BRIEF DESCRIPTION OF DRAWINGS

The technical features of the invention, with reference to the above aim, are clearly described in the appended claims and its advantages are apparent from the detailed description which follows, with reference to the accompanying drawings which illustrate a preferred non-limiting example embodiment of it, and in which:

FIG. 2 shows a partly exploded view of the anti-rotation mechanism implemented in the actuator of FIG. 1;

FIG. 3 shows the anti-rotation mechanism of FIG. 2 in a cross section through the line III-III of FIG. 5;

FIG. 3A is a sectional view of a portion of the anti-rotation mechanism of FIG. 2;

FIG. 4 shows a front view of the anti-rotation mechanism of FIG. 2;

FIG. 5 shows the anti-rotation mechanism of FIG. 2 in an assembled and operational configuration;

FIG. 6 shows the anti-rotation mechanism of FIG. 2 in a cross section through the line VI-VI of FIG. 4.

DETAILED DESCRIPTION OF THE PREFERRED EMBODIMENTS OF THE INVENTION

Figure 1:
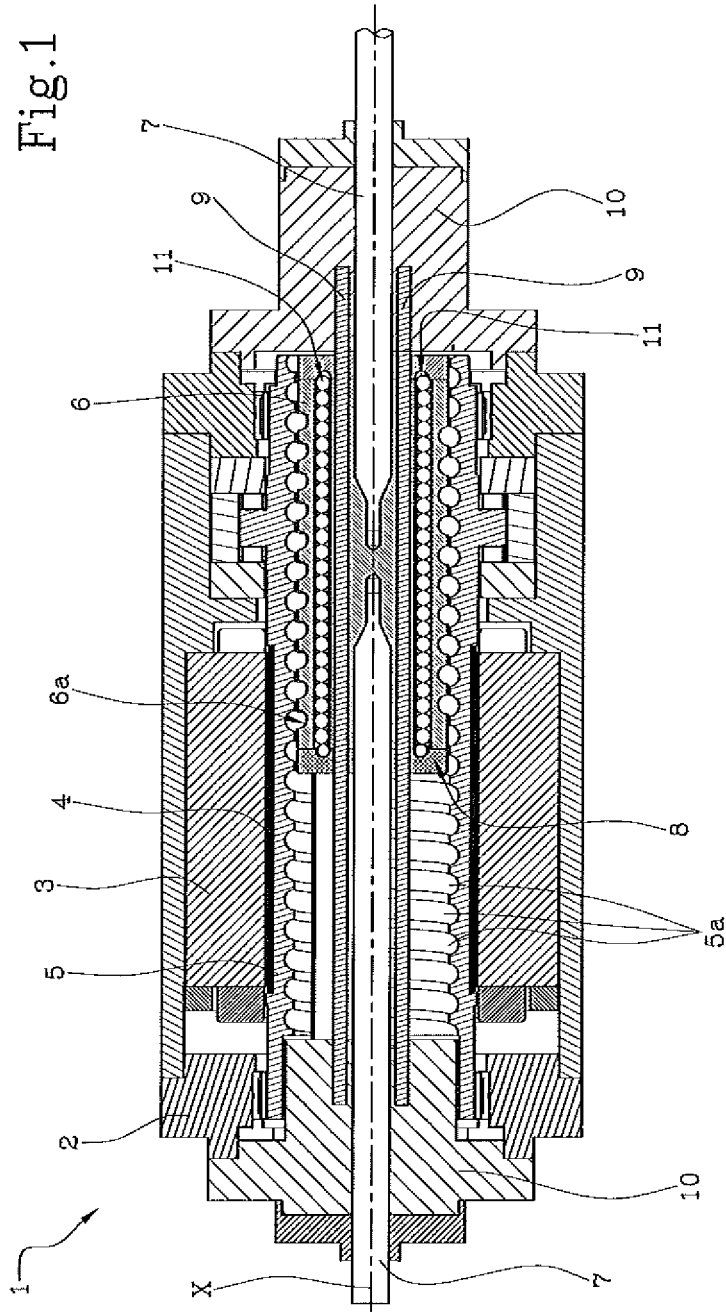
FIG. 1 is a sectional view, along a longitudinal plane labelled I-I in FIG. 4, of an electro-mechanical actuator according to this invention.

With reference to the accompanying drawings, the numeral 1 denotes in its entirety a linear electro-mechanical actuator with built-in anti-rotation.

As shown in FIG. 1, the actuator 1 comprises a rigid containment structure 2 housing an electric motor, in particular an outer stator 3 and a rotor 4 positioned inside the stator 3.

Inside the rotor 4, and in rigid connection with it, there is a nut 5 having an axis of rotation "X" which coincides with the axis of the rotor 4. The nut 5 if therefore rotated by the electromagnetic interaction between rotor 4 (usually of the permanent magnets type) and stator 5.

In the embodiment illustrated, the nut 5 has a main direction of extension coinciding with the above-mentioned axis "X".

The nut 5 is only enabled for rotating about the axis "X", and is prevented from translating along the axis "X" for example by special locking shoulders or other known solutions.

Inside the nut 5 there is a screw shaft 6 which extends about an axis coinciding with the axis "X".

The screw shaft 6 is interconnected with the nut 5 by means of a helical coupling, preferably of the recirculating ball type (but could also be of a different type, for example of the lead nut and screw type) in such a way that a mutual rotation between nut 5 and screw shaft 6 causes a mutual translation of them along the axis "X".

In the embodiment illustrated in the accompanying drawings, and as can be seen in FIG. 1, both the inner surface of the nut 5 and the outer surface of the screw shaft 6 have respective helical grooves 5a, 6a designed for mutual engaging.

At each of its axial ends, the screw shaft 6 is stably connected to a pusher 7 forming the active element of the actuator 1. More specifically, each pusher 7 passes through a special opening of the containment structure 2 to come out from the latter and it can be translated together with the screw shaft 6 to form a plurality of operating positions along the axis "X".

The actuator 1 also comprises an anti-rotation mechanism 8 acting on the screw shaft 6 to prevent the screw shaft 6 rotating about the axis "X".

In other words, the anti-rotation mechanism 8 keeps the screw shaft 6 rotationally fixed during rotation of the nut 5 in such a way that the rotation of the nut 5 causes the translation of the screw shaft 6 along the axis "X".

The anti-rotation mechanism 8 is shaped n such a way as to guide, at the same time, in a fluid and precise fashion the screw shaft 6 translationally along the axis "X".

In more detail, the anti-rotation mechanism 8 comprises at least one guide bar 9 fixed at its ends to the containment structure 2 and coupled in a sliding fashion with the screw shaft 6. In the embodiment illustrated, there are two guide bars 9 parallel to each other.

The ends of the guide bars 9 are fixed by connecting with supporting flanges 10, facing each other, of the containment structure 2, for example by inserting the ends of the guide bars 9 inside respective housings made on the above-mentioned flanges 10. The supporting flanges 10 can for example constitute head flanges of the actuator 1, transversal to the axis "X", from which the pushers 7 come out and designed to stop the actuator.

The guide bars 9 have respective main directions of extension which are rectilinear (at least in the undeformed condition, that is to say, unloaded) and parallel to the axis "X" and, so as to disengage the space about the axis "X" already engaged by the presence of the pushers 7, the guide bars 9 are spaced from the axis "X".

In more detail, the guide bars 9 are positioned at a minimum distance from the axis "X" greater than a maximum transversal dimension (perpendicular to the axis "X") of the pushers 7, in particular of a cylindrical portion of the pushers designed to pass through the containment structure 2.

Preferably, the above-mentioned cylindrical portion of the pushers 7 has a circular cross section. However, the cross section might have a different shape.

Preferably, the guide bars 9 are positioned symmetrically relative to the axis "X". In other words, the guide bars 9 are positioned diametrically opposite each other, that is, spaced at angular intervals to each other of 180° about the axis "X".

The above-mentioned anti-rotation mechanism 8 also comprises, for each guide bar 9, at least one recirculating ball screw 11 interposed between the guide bar 9 and an inner portion of the screw shaft 6.

As shown in FIGS. 2 to 4, each guide bar 9 is shaped in such a way as to have at least one rolling track 12, with a profile preferably having a circumferential arc shape, on which the balls of the recirculating ball screw 11 engage. Preferably, each guide bar 9 has a pair of rolling tracks 12 facing each other and on each of which a respective recirculating balls screw 11 operates.

FIG. 3A shows in detail the shape of the guide bars 9 in a section transversal to the axis "X". According to that section, each guide bar 9 has at least one head portion substantially T-shaped having a central portion 9a and two lateral protuberances 9b connected with the central portion 9a and forming, at the connection with the central portion 9a, the above-mentioned rolling tracks 12.

As shown in FIG. 6, the recirculating ball screws 11 associated with the guide bar extend on respective closed paths. The closed paths lie on respective planes incident with each other and in particular converging away from the axis (X), as clearly shown in FIGS. 3 and 4.

As shown in FIG. 6, the screw shaft 6 comprises:
a central portion 6 having externally a helical groove 6a for connection with the nut 5 and also having at least one first inner groove 14 and a second inner groove 15, positioned side by side with each other and corresponding respectively with a first stretch 11a and a second stretch 11b of a recirculating ball screw 11, and
two end covers 16 positioned transversally to the axis "X" and forming respective curved grooves 11c for connecting between the inner grooves 14, 15.

As shown in FIGS. 3 and 4, the first stretch 11a of the recirculating ball screw 11 faces a longitudinal cavity of the screw shaft 6 designed for housing a respective guide bar 9.

Also, as shown in FIGS. 3 and 4, the first stretch 11a of each recirculating ball screw 11 is directly in contact on a rolling track 12 (indicated in FIG. 3A) of the respective guide bar 9.

In the embodiment illustrated, the two stretches 11a, 11b of the recirculating ball screw 11 are substantially parallel to the axis "X" and are positioned substantially at the same distance from the axis "X".

Preferably, for a correct distribution of the balls the first inner grooves 14 of FIG. 3 (that is to say, the grooves facing the longitudinal cavity of the screw shaft 6 and forming the first stretch 11a of the recirculating ball screw 11) are not perfectly rectilinear but have a curvature (minimal) such as to follow the elastic line of the opposing guide bars 9. This elastic line is defined on the basis of the deformations under the operational load. Consequently, the first stretch 11a of each recirculating ball screw 11 is preferably not rectilinear (although orientated substantially parallel to the axis "X") whilst the corresponding second stretch 11b can be kept rectilinear.

Preferably, the rolling tracks 12 are ground to a very low roughness so as to increase the mechanical efficiency and make the contact pressures as uniform as possible.

The present invention achieves the aim set by overcoming the above-mentioned disadvantages of the prior art.

The anti-rotation mechanism used allows a very reduced length of the entire actuator to be obtained, as the anti-rotation mechanism is made directly as one piece inside the screw, does not occupy space and does not force the screw to extend, unlike the cases in which the anti-rotation is positioned in cascade with the nut-screw shaft coupling.

Moreover, the use of balls as the contact surfaces between the screw and the guide bars makes it possible to have very high efficiencies. As there is no sliding between the parts but purely rolling, the output lost due to friction is considerably lower, with a consequent reduction in the wear and the heat generated.

The invention claimed is:

1. A linear electro-mechanical actuator with built-in anti-rotation, comprising:
a containment structure (2);
at least one pusher designed to translate relative to the containment structure (2) in such a way that it at least partly comes out of the containment structure (2) during actuator (1) operation;
a nut (5) located in the containment structure (2) and able to rotate about an axis (X) driven by a driving force;
a screw shaft (6) inserted in the nut (5) and connected to the pusher, the screw shaft (6) being interconnected with the nut (5) by means of a helical recirculating ball coupling (5a, 6a) in such a way that a rotation of the nut (5) causes a translation of the screw shaft (6) along the axis (X);

an anti-rotation mechanism (8) acting on the screw shaft (6) to prevent the screw shaft (6) from rotating about said axis (X);

characterised in that the anti-rotation mechanism (8) comprises at least one guide bar (9) fixed to the containment structure (2) and coupled in a sliding fashion with the screw shaft (6), the guide bar (9) extending along a direction parallel to the axis (X) and spaced from the axis (X), wherein the at least one guide bar (9) is shaped in such a way as to have at least one rolling track (12) and wherein the anti-rotation mechanism (8) also comprises at least one recirculating ball screw (11) interposed between the rolling track (12) and an inner portion of the screw shaft (6), and wherein at least one guide bar (9) has two rolling tracks (12) facing each other and wherein the anti-rotation mechanism (8) also comprises recirculating ball screws (11) each or which interposed between a respective rolling track (12) and the inner portion of the screw shaft (6).

2. The actuator according to claim 1, wherein the at least one pusher (7) has a cylindrical portion designed to pass through the containment structure (2), and wherein the at least one guide bar (8) is positioned at a minimum distance from the axis (X) greater than a maximum transversal dimension of the cylindrical portion of the pusher (7).

3. The actuator according to claim 1, wherein the containment structure (2) comprises a pair of supporting flanges (10) facing each other and positioned transversally to the axis (X), and wherein the at least one guide bar (9) has respective ends fixed to the supporting flanges (10).

4. The actuator according to claim 1, wherein the recirculating ball screws (11) associated with the guide bar extend on respective closed paths lying on respective planes incident with each other.

5. The actuator according to claim 1, wherein the planes converge away from the axis (X).

6. The actuator according to claim 1, wherein each guide bar (9) has at least one head portion substantially T-shaped having a central portion (9a) and two lateral protuberances (9b) facing each other connected with the central portion (9a) and forming, at the connection with the central portion (9a), the rolling tracks (12).

7. The actuator according to claim 1, wherein the anti-rotation mechanism (8) comprises two guide bars (9), positioned symmetrically relative to the axis (X).

8. The actuator according to claim 1, wherein the screw shaft (6) comprises:
a central portion (13) having externally a helical groove (6a) for connection with the nut (5) and also having at least one first inner groove (14) and a second inner groove (15), positioned side by side with each other and corresponding respectively with a first stretch (11a) and a second stretch (11b) of the at least one recirculating ball screw (11), and
two end covers (17) positioned transversally to the axis (X) and forming respective curved grooves (16) for connecting between the inner grooves (14, 15).

9. The actuator according to claim 8, wherein the first stretch (11a) of the recirculating ball screw (11) faces a longitudinal cavity of the screw shaft (6) designed for housing a respective guide bar (9).

10. The actuator according to claim 8, wherein the first stretch (11a) of the at least one recirculating ball screw (11) is positioned in contact with the rolling track (12) and extends along a curved line designed to follow a line of elastic deformation, under load, of the respective guide bar (9).

11. The actuator according to claim 1, comprising a pair of pushers (7) facing each other and connected to the screw shaft (6) at opposite sides of the screw shaft (6).

12. The actuator according to claim 2, wherein the containment structure (2) comprises a pair of supporting flanges (10) facing each other and positioned transversally to the axis (X), and wherein the at least one guide bar (9) has respective ends fixed to the supporting flanges (10).

13. The actuator according to claim 4, wherein each guide bar (9) has at least one head portion substantially T-shaped having a central portion (9a) and two lateral protuberances (9b) facing each other connected with the central portion (9a) and forming, at the connection with the central portion (9a), the rolling tracks (12).

14. The actuator according to claim 5, wherein each guide bar (9) has at least one head portion substantially T-shaped having a central portion (9a) and two lateral protuberances (9b) facing each other connected with the central portion (9a) and forming, at the connection with the central portion (9a), the rolling tracks (12).

15. The actuator according to claim 1, wherein the screw shaft (6) comprises:
a central portion (13) having externally a helical groove (6a) for connection with the nut (5) and also having at least one first inner groove (14) and a second inner groove (15), positioned side by side with each other and corresponding respectively with a first stretch (11a) and a second stretch (11b) of the at least one recirculating ball screw (11), and
two end covers (17) positioned transversally to the axis (X) and forming respective curved grooves (16) for connecting between the inner grooves (14, 15).

16. The actuator according to claim 4, wherein the screw shaft (6) comprises:
a central portion (13) having externally a helical groove (6a) for connection with the nut (5) and also having at least one first inner groove (14) and a second inner groove (15), positioned side by side with each other and corresponding respectively with a first stretch (11a) and a second stretch (11b) of the at least one recirculating ball screw (11), and
two end covers (17) positioned transversally to the axis (X) and forming respective curved grooves (16) for connecting between the inner grooves (14, 15).

17. The actuator according to claim 5, wherein the screw shaft (6) comprises:
a central portion (13) having externally a helical groove (6a) for connection with the nut (5) and also having at least one first inner groove (14) and a second inner groove (15), positioned side by side with each other and corresponding respectively with a first stretch (11a) and a second stretch (11b) of the at least one recirculating ball screw (11), and
two end covers (17) positioned transversally to the axis (X) and forming respective curved grooves (16) for connecting between the inner grooves (14, 15).

18. The actuator according to claim 9, wherein the first stretch (11a) of the at least one recirculating ball screw (11) is positioned in contact with the rolling track (12) and extends along a curved line designed to follow a line of elastic deformation, under load, of the respective guide bar (9).

19. A linear electro-mechanical actuator with built-in anti-rotation, comprising:
a containment structure (2);
at least one pusher designed to translate relative to the containment structure (2) in such a way that it at least partly comes out of the containment structure (2) during actuator (1) operation;

a nut (5) located in the containment structure (2) and able to rotate about an axis (X) driven by a driving force;

a screw shaft (6) inserted in the nut (5) and connected to the pusher, the screw shaft (6) being interconnected with the nut (5) by means of a helical recirculating ball coupling (5a, 6a) in such a way that a rotation of the nut (5) causes a translation of the screw shaft (6) along the axis (X);

an anti-rotation mechanism (8) acting on the screw shaft (6) to prevent the screw shaft (6) from rotating about said axis (X); characterised in that the anti-rotation mechanism (8) comprises at least one guide bar (9) fixed to the containment structure (2) and coupled in a sliding fashion with the screw shaft (6), the guide bar (9) extending along a direction parallel to the axis (X) and spaced from the axis (X), wherein the at least one pusher (7) has a cylindrical portion designed to pass through the containment structure (2), and wherein the at least one guide bar (8) is positioned at a minimum distance from the axis (X) greater than a maximum transversal dimension of the cylindrical portion of the pusher (7).

20. A linear electro-mechanical actuator with built-in anti-rotation, comprising:

a containment structure (2);

at least one pusher designed to translate relative to the containment structure (2) in such a way that it at least partly comes out of the containment structure (2) during actuator (1) operation;

a nut (5) located in the containment structure (2) and able to rotate about an axis (X) driven by a driving force;

a screw shaft (6) inserted in the nut (5) and connected to the pusher, the screw shaft (6) being interconnected with the nut (5) by means of a helical recirculating ball coupling (5a, 6a) in such a way that a rotation of the nut (5) causes a translation of the screw shaft (6) along the axis (X);

an anti-rotation mechanism (8) acting on the screw shaft (6) to prevent the screw shaft (6) from rotating about said axis (X); characterised in that the anti-rotation mechanism (8) comprises at least one guide bar (9) fixed to the containment structure (2) and coupled in a sliding fashion with the screw shaft (6), the guide bar (9) extending along a direction parallel to the axis (X) and spaced from the axis (X), wherein the containment structure (2) comprises a pair of supporting flanges (10) facing each other and positioned transversally to the axis (X), and wherein the at least one guide bar (9) has respective ends fixed to the supporting flanges (10).

\* \* \* \* \*